US012749926B2

(12) United States Patent
Kanakasabai et al.

(10) Patent No.: US 12,749,926 B2
(45) Date of Patent: Sep. 29, 2026

(54) WIRELESS POWER TRANSMISSION APPARATUS WITH MULTIPLE CONTROLLERS AND ADJACENT COIL MUTING

(71) Applicant: GE Hybrid Technologies, LLC, Niskayuna, NY (US)

(72) Inventors: Viswanathan Kanakasabai, Bangalore (IN); Suma Memana Narayana Bhat, Bangalore (IN); Jayanti Ganesh, Bangalore (IN); Subbarao Tatikonda, Bangalore (IN); Rupam Basak, Howrah (IN)

(73) Assignee: GE Hybrid Technologies, LLC, Niskayuna, NY (US)

( * ) Notice: Subject to any disclaimer, the term of this patent is extended or adjusted under 35 U.S.C. 154(b) by 478 days.

(21) Appl. No.: 17/640,298

(22) PCT Filed: Sep. 3, 2020

(86) PCT No.: PCT/US2020/049180
§ 371 (c)(1),
(2) Date: Mar. 3, 2022

(87) PCT Pub. No.: WO2021/046204
PCT Pub. Date: Mar. 11, 2021

(65) Prior Publication Data

US 2022/0344979 A1 Oct. 27, 2022

(30) Foreign Application Priority Data

Sep. 4, 2019 (IN) ............................ 201911035597

(51) Int. Cl.
*H02J 50/70* (2016.01)
*H02J 7/50* (2026.01)
(Continued)

(52) U.S. Cl.
CPC ................ *H02J 50/70* (2016.02); *H02J 7/50* (2026.01); *H02J 50/12* (2016.02); *H02J 50/402* (2020.01); *H02J 50/90* (2016.02)

(58) Field of Classification Search
None
See application file for complete search history.

(56) References Cited

U.S. PATENT DOCUMENTS 6,552,422 B1 4/2003 Schober
8,629,650 B2 1/2014 Mohammadian et al.
(Continued)

FOREIGN PATENT DOCUMENTS

AU 2018101451 11/2018
CN 107294224 A 10/2017
(Continued)

OTHER PUBLICATIONS

"India Application No. 201911035597 First Examination Report", Aug. 3, 2021, 6 pages.
(Continued)

*Primary Examiner* — Daniel Kessie
(74) *Attorney, Agent, or Firm* — DeLizio, Peacock, Lewin & Guerra LLP

(57) ABSTRACT

This disclosure provides systems, devices, apparatus and methods, including computer programs encoded on storage media, for a wireless power transmission apparatus that supports charging of one or more wireless power receiving apparatuses. The wireless power transmission apparatus (such as a charging pad or surface) may include multiple primary coils and multiple local controllers (such as one local controller per primary coil). Each local controller can independently activate a primary coil to supply power to a wireless power receiving apparatus. Thus, the wireless power transmission apparatus may support concurrent
(Continued)

charging of multiple wireless power receiving apparatuses. When a first primary coil is activated, a local controller can mute or disable the adjacent primary coils (near the first primary coil) to mitigate undesirable interference. In some implementations, the local controller may provide a status to other local controllers (associated with adjacent primary coils) to disable the adjacent primary coils.

23 Claims, 10 Drawing Sheets

(51) Int. Cl.
*H02J 50/12* (2016.01)
*H02J 50/40* (2016.01)
*H02J 50/90* (2016.01)

(56) References Cited

U.S. PATENT DOCUMENTS

| | | | | |
|---|---|---|---|---|
| 8,629,654 | B2 | 1/2014 | Partovi et al. | |
| 8,965,720 | B2 | 2/2015 | Azancot et al. | |
| 9,112,363 | B2 | 8/2015 | Partovi | |
| 9,142,990 | B2 | 9/2015 | Keeling et al. | |
| 9,570,926 | B2 | 2/2017 | Madau et al. | |
| 9,590,447 | B2 | 3/2017 | Knepper | |
| 9,620,985 | B2 | 4/2017 | Rosenfeld | |
| 9,698,608 | B2 | 7/2017 | Keeling et al. | |
| 9,780,572 | B2 | 10/2017 | Standke et al. | |
| 9,893,553 | B2 | 2/2018 | Pudipeddi et al. | |
| 10,044,234 | B2 | 8/2018 | Muurinen et al. | |
| 11,374,431 | B2 * | 6/2022 | Keith | H02J 50/40 |
| 2007/0103025 | A1 | 5/2007 | Rohrer et al. | |
| 2007/0279002 | A1 | 12/2007 | Partovi | |
| 2009/0033280 | A1 | 2/2009 | Choi et al. | |
| 2009/0224723 | A1 * | 9/2009 | Tanabe | H02J 50/80 320/108 |
| 2009/0230777 | A1 | 9/2009 | Baarman et al. | |
| 2010/0259217 | A1 | 10/2010 | Baarman et al. | |
| 2010/0314946 | A1 | 12/2010 | Budde et al. | |
| 2013/0015719 | A1 | 1/2013 | Jung et al. | |
| 2015/0303699 | A1 | 10/2015 | Wagman et al. | |
| 2015/0318730 | A1 | 11/2015 | Bhargava et al. | |
| 2016/0013661 | A1 | 1/2016 | Kurs et al. | |
| 2016/0056432 | A1 | 2/2016 | Searles | |
| 2016/0072299 | A1 | 3/2016 | Huang et al. | |
| 2016/0099578 | A1 | 4/2016 | Hwang | |
| 2016/0308394 | A1 | 10/2016 | Abdolkhani et al. | |
| 2017/0085116 | A1 | 3/2017 | Tsao | |
| 2017/0095667 | A1 | 4/2017 | Yakovlev et al. | |
| 2017/0317536 | A1 | 11/2017 | Marson et al. | |
| 2017/0338684 | A1 | 11/2017 | Mishriki et al. | |
| 2017/0358960 | A1 | 12/2017 | Percebon | |
| 2018/0013310 | A1 | 1/2018 | Moussaoui et al. | |
| 2018/0019624 | A1 | 1/2018 | Chen | |
| 2018/0034327 | A1 | 2/2018 | Ren et al. | |
| 2018/0052649 | A1 | 2/2018 | Patel | |
| 2018/0061563 | A1 | 3/2018 | Budhia et al. | |
| 2018/0062416 | A1 | 3/2018 | Terry et al. | |
| 2018/0062442 | A1 | 3/2018 | Qiu et al. | |
| 2018/0090954 | A1 | 3/2018 | Graham et al. | |
| 2018/0090955 | A1 | 3/2018 | Graham et al. | |
| 2018/0090999 | A1 | 3/2018 | Graham et al. | |
| 2018/0091000 | A1 | 3/2018 | Jol et al. | |
| 2018/0097403 | A1 | 4/2018 | Jung | |
| 2018/0114634 | A1 | 4/2018 | Lin | |
| 2018/0131235 | A1 | 5/2018 | Inoue et al. | |
| 2018/0175671 | A1 | 6/2018 | Ren | |
| 2018/0219403 | A1 | 8/2018 | Schneider | |
| 2018/0233954 | A1 | 8/2018 | Yang et al. | |
| 2018/0301933 | A1 | 10/2018 | Lee et al. | |
| 2018/0301936 | A1 | 10/2018 | Lee et al. | |
| 2018/0323634 | A1 | 11/2018 | Lee | |
| 2019/0027298 | A1 | 1/2019 | Jadidian et al. | |
| 2019/0052103 | A1 | 2/2019 | Li et al. | |
| 2019/0068000 | A1 | 2/2019 | de Rooij et al. | |
| 2019/0089187 | A1 | 3/2019 | Konomi | |
| 2020/0120762 | A1 | 4/2020 | Ok et al. | |
| 2020/0212721 | A1 | 7/2020 | Narayana Bhat et al. | |
| 2021/0028653 | A1 | 1/2021 | Park et al. | |
| 2021/0127459 | A1 | 4/2021 | Ok et al. | |
| 2021/0380605 | A1 | 12/2021 | Howard et al. | |
| 2022/0085662 | A1 | 3/2022 | Narayana Bhat et al. | |
| 2022/0247229 | A1 | 8/2022 | Basak et al. | |
| 2024/0186837 | A1 | 6/2024 | Basak et al. | |

FOREIGN PATENT DOCUMENTS

| | | | |
|---|---|---|---|
| CN | 108711945 | | 10/2018 |
| EP | 2555378 | | 2/2013 |
| JP | 2011045236 | A | 3/2011 |
| JP | 2011174827 | A | 9/2011 |
| JP | 2013110848 | A | 6/2013 |
| JP | 2014230399 | A | 12/2014 |
| JP | 2015019484 | A | 1/2015 |
| JP | 2017022861 | A | 1/2017 |
| JP | 2018177186 | A | 11/2018 |
| KR | 20130083660 | A | 7/2013 |
| WO | 2014176838 | | 11/2014 |
| WO | 2014176855 | | 11/2014 |
| WO | 2016005984 | | 1/2016 |
| WO | 2016045212 | | 3/2016 |
| WO | 2016045213 | | 3/2016 |
| WO | 2016163838 | | 10/2016 |
| WO | 2017176128 | | 10/2017 |
| WO | 2018057656 | | 3/2018 |
| WO | 2018149381 | | 8/2018 |
| WO | 2018155858 | | 8/2018 |
| WO | 2018196284 | | 11/2018 |
| WO | 2019004753 | | 1/2019 |
| WO | 2019028474 | | 2/2019 |
| WO | 2019107715 | A1 | 6/2019 |
| WO | 2021046204 | | 3/2021 |

OTHER PUBLICATIONS

"PCT Application No. PCT/US2020/049180 International Search Report and Written Opinion", Nov. 13, 2020.
"China application No. 202080052590.6 Second Office Action", dated Jan. 18, 2025, 15 pages.
"China patent application No. 202080052590.6 Office Action", dated Jul. 26, 2024, 13 pages.
"CN application No. 202080061249.7 Office action"; Sep. 30, 2025; 6 pages.
"EP Application No. 20 772 182.0-1002 Communication pursuant to Art 94", dated Jan. 29, 2025, 6 pages.
"India Application No. 201911020202 Examination Report", dated Feb. 5, 2024, 5 pages.
"Japan patent application 2022512716 NOA", dated Dec. 13, 2024, 2 pages.
"Japan patent Application No. 2021-568983 1st Office Action", dated May 14, 2024, 7 pages.
"Japan Patent Application No. 2022-512716 1st Office Action", dated Sep. 3, 2024, 6 pages.
"Korea application No. 10-2022-7011146 Request for Submission of Opinion", dated Feb. 17, 2025, 5 pages.
"PCT Application No. PCT/US2020/033782 International Search Report and Written Opinion", dated Sep. 15, 2020, 10 pages.
"U.S. Appl. No. 17/612,805 Non Final Office Action", dated Apr. 1, 2025, 14 pages.
"U.S. Appl. No. 17/612,805 Non Final Office Action", dated May 3, 2023, 14 pages.
"U.S. Appl. No. 18/444,073 Final Office Action", dated Sep. 11, 2024, 18 pages.
"U.S. Appl. No. 18/444,073 Non Final Office Action", dated Jul. 31, 2024, 13 pages.
Vietnam application No. 1-2022-02077 Written Opinion.

* cited by examiner

WIRELESS POWER TRANSMISSION APPARATUS WITH MULTIPLE CONTROLLERS AND ADJACENT COIL MUTING

TECHNICAL FIELD

This disclosure relates generally to wireless power, and more specifically, to a wireless power transmission apparatus.

DESCRIPTION OF THE RELATED TECHNOLOGY

Conventional wireless power systems have been developed with a primary objective of charging a battery in a wireless power receiving apparatus, such as a mobile device, a small electronic device, gadget, or the like. In a conventional wireless power system, a wireless power transmission apparatus may include a primary coil that produces an electromagnetic field. The electromagnetic field may induce a voltage in a secondary coil of a wireless power receiving apparatus when the secondary coil is placed in proximity to the primary coil. In this configuration, the electromagnetic field may transfer power to the secondary coil wirelessly. The power may be transferred using resonant or non-resonant inductive coupling between the primary coil and the secondary coil. The wireless power receiving apparatus may use the received power to operate or may store the received energy in a battery for subsequent use. The power transfer capability may be related to how closely the primary coil and secondary coil are positioned to each other. Therefore, in some traditional wireless power systems, the structure of the wireless power transmission apparatus may be designed to limit positioning of the wireless power receiving apparatus and impose an expected alignment between the primary coil and secondary coil.

SUMMARY

The systems, methods and apparatuses of this disclosure each have several innovative aspects, no single one of which is solely responsible for the desirable attributes disclosed herein.

One innovative aspect of the subject matter described in this disclosure can be implemented in a wireless power transmission apparatus. In some implementations, the wireless power transmission apparatus may include a plurality of primary coils that are independently capable of transmitting wireless power. The plurality of primary coils may include at least a first primary coil and a second primary coil that are adjacent or overlapping with each other. The wireless power transmission apparatus may include a plurality of local controllers configured to manage the plurality of primary coils, the plurality of local controllers including at least a first local controller and a second local controller for controlling the first primary coil and the second primary coil, respectively. In response to a determination that a first wireless power receiving apparatus is in proximity to the first primary coil, the first local controller may be configured to cause the first primary coil to transmit wireless power. The first local controller may be configured to send a first status signal to the second local controller, the first status signal causing the second local controller to disable the second primary coil that is adjacent or overlapping with the first primary coil. Other embodiments of this aspect include corresponding computer systems, apparatus, and computer programs recorded on one or more computer storage devices, each configured to perform the actions of the methods.

Another innovative aspect of the subject matter described in this disclosure can be implemented as a method performed by a wireless power transmission apparatus. The method may include managing a plurality of primary coils in a wireless power transmission apparatus, where the plurality of primary coils is independently capable of transmitting wireless power. The plurality of primary coils may include at least a first primary coil and a second primary coil that are adjacent or overlapping with each other. The plurality of primary coils may be managed by a corresponding plurality of local controllers, including at least a first local controller and a second local controller for controlling the first primary coil and the second primary coil, respectively. The method also includes determining that a first wireless power receiving apparatus is in proximity to a first primary coil, and in response to a determination that a first wireless power receiving apparatus is in proximity to the first primary coil, causing, by a first local controller of the plurality of local controllers, the first primary coil to transmit wireless power. The method also may include sending a first status signal to the second local controller, the first status signal causing the second local controller to disable the second primary coil that is adjacent or overlapping with the first primary coil. In some implementations, the wireless power transmitting apparatuses and methods may include, in response to a determination that the first wireless power receiving apparatus is in proximity to the second primary coil, the second local controller causing the second primary coil to transmit wireless power. The second local controller also may send a second status signal to the first local controller, the second status signal causing the first local controller to disable the first primary coil that is adjacent or overlapping with the second primary coil.

In some implementations, the wireless power transmitting apparatuses and methods may include the first local controller and the second local controller being configured to prevent concurrent transmission of wireless power by the first primary coil and the second primary coil.

In some implementations, the first wireless power receiving apparatus is determined to be in proximity to the first primary coil based, at least in part, on a first communication received from the first wireless power receiving apparatus by the first local controller via the first primary coil.

In some implementations, the wireless power transmitting apparatuses and methods may include a third local controller and a third primary coil. The wireless power transmission apparatus may also include the first primary coil and the third primary coil not being adjacent or overlapping with each other. The wireless power transmission apparatus may also include the first local controller and the third local controller being configured to concurrently transmit wireless power via the first primary coil and the third primary coil to different wireless power receiving apparatuses.

In some implementations, each of the plurality of local controllers are communicatevly coupled to at least one other local controller associated with an adjacent or overlapping primary coil.

In some implementations, the wireless power transmitting apparatuses and methods may include at least a first logic circuit configured to combine the first status signal with one or more status signals from one or more other local controllers associated with primary coils that are adjacent or overlapping with the second primary coil to form a combined status signal. The wireless power transmission apparatus may also include sending the combined status signal to a disable input of the second local controller, where the disable input of the second local controller causes the second local controller to disable the second primary coil when any of the first status signal or one or more other status signals indicate that an adjacent or overlapping primary coil is transmitting wireless power.

In some implementations, the wireless power transmitting apparatuses and methods may include, each local controller having a disable input that receives one or more status signals from other local controllers that are associated with adjacent or overlapping primary coils, and where the disable input causes the local controller to disable its associated primary coil when any of the other local controllers that are associated with adjacent or overlapping primary coils are transmitting wireless power.

In some implementations, the wireless power transmitting apparatuses and methods may include one or more logic circuits that combine one or more status signals from other local controllers that are associated with adjacent or overlapping primary coils and provide a combined status signal to the disable input.

In some implementations, the one or more logic circuits may include logical "OR" gates.

In some implementations, each local controller is configured to provide a status signal to one or more other local controllers that are associated with adjacent or overlapping primary coils, and the status signal may cause the one or more other local controllers to disable their associated primary coils when the local controllers is transmitting wireless power.

In some implementations, each status signal represents a boolean value to indicate whether each local controller is or is not transmitting wireless power via its associated primary coil.

In some implementations, each status signal is a floating-point value, where each floating-point value indicates different information regarding wireless power transmission of an associated primary coil.

In some implementations, the wireless power transmitting apparatuses and methods may include a charging pad on which multiple wireless power receiving apparatuses may be placed, where the plurality of primary coils is arranged in an overlapping pattern that is distributed among multiple layers of the charging pad.

In some implementations, the first wireless power receiving apparatus is a movable device, and the wireless power transmission apparatus includes a surface for transmitting power to the movable device while the movable device is in motion.

Implementations of the described techniques may include hardware, a method or process, or computer software on a computer-accessible medium.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
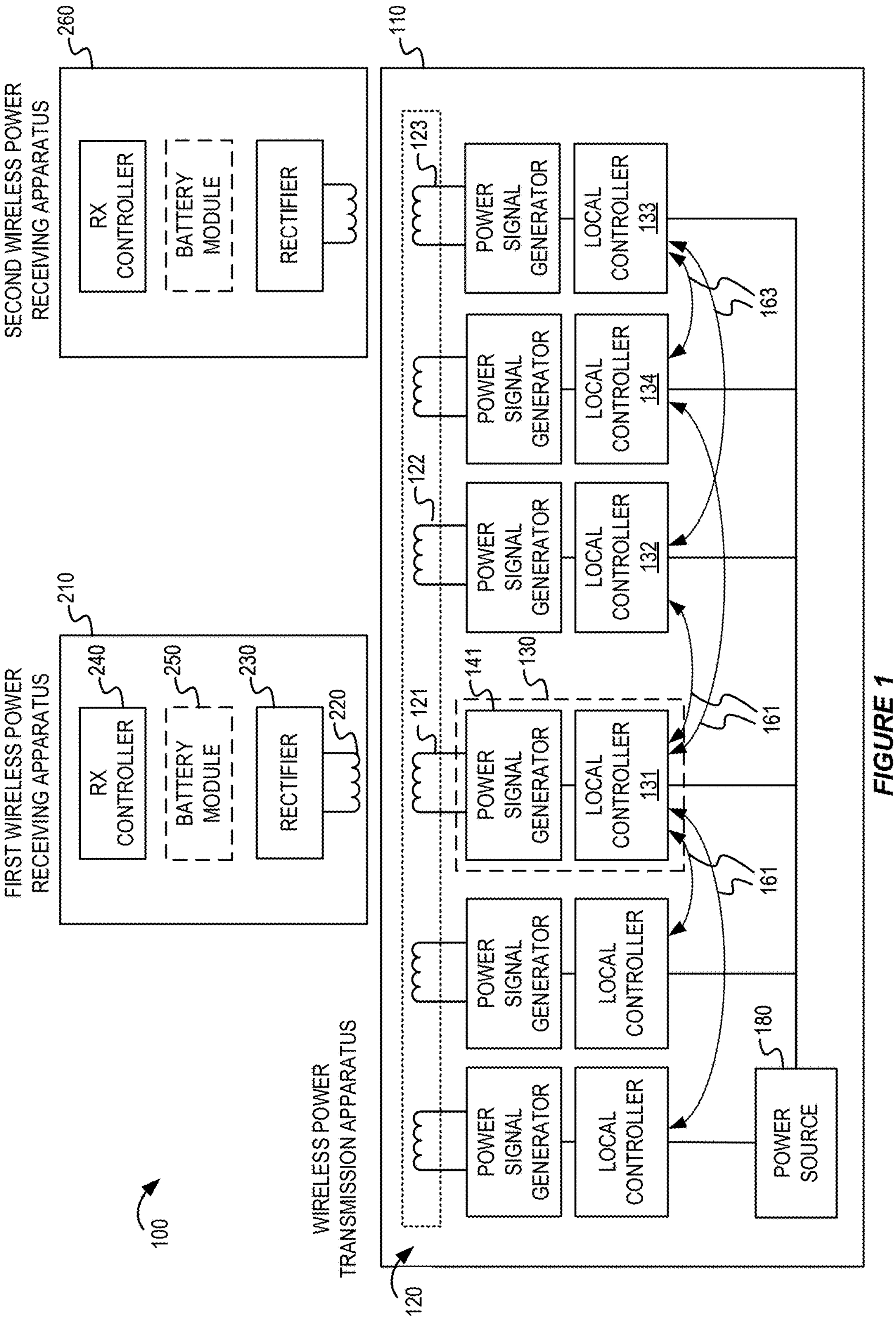
FIG. 1 shows an overview of components associated with an example wireless power system.

The following description is directed to certain implementations for the purposes of describing innovative aspects of this disclosure. However, a person having ordinary skill in the art will readily recognize that the teachings herein can be applied in a multitude of different ways. The described implementations can be implemented in any means, apparatus, system or method for transmitting or receiving wireless power.

A conventional wireless power system may include a wireless power transmission apparatus and a wireless power receiving apparatus. A wireless power transmission apparatus may include a primary coil that transmits wireless energy (as a wireless power signal) to a corresponding secondary coil in the wireless power receiving apparatus. A primary coil refers to a source of wireless energy (such as inductive or magnetic resonant energy) in a wireless power transmission apparatus. A secondary coil in a wireless power receiving apparatus receives the wireless energy. Wireless power transmission is more efficient when the primary and secondary coils are closely positioned. Conversely, the efficiency may decrease (or the power transfer may cease) when the primary and secondary coils are misaligned. A conventional wireless power transmission apparatus may include a controller that enables or disables the transmission of wireless energy based on how closely the wireless power receiving apparatus is positioned in relation to the wireless power transmission apparatus. For example, the transmission of wireless energy may depend on the degree of alignment between transmitting and receiving coils. In this disclosure, alignment may refer to a spatial relationship between a secondary coil of the wireless power receiving apparatus and a primary coil of the wireless power transmission apparatus.

In an effort to address misalignment concerns and to provide a greater degree of positioning flexibility, some wireless power transmission apparatuses may include multiple primary coils. For example, a charging surface of the wireless power transmission apparatus may have an arrangement of primary coils. The primary coils may be configured in an overlapping or in a non-overlapping arrangement. The arrangement of primary coils (overlapping or non-overlapping) may be designed to minimize, reduce, or eliminate dead zones. Depending on an orientation and position of the wireless power receiving apparatus on the charging surface, different primary coils may be activated to provide power to corresponding secondary coils of the wireless power receiving apparatus. Thus, the wireless power transmission apparatus may support positional freedom such that a wireless power receiving apparatus may be charged regardless of positioning or orientation of the wireless power receiving apparatus with regard to the charging surface. Furthermore, multiple wireless power receiving apparatuses may be concurrently charged using different primary coils of the wireless power transmission apparatus. However, when a wireless power transmission apparatus has multiple primary coils, it is possible for unused primary coils to create undesirable electromagnetic interference (EMI) to a nearby primary that is providing wireless power to a wireless power receiving apparatus.

Various implementations of this disclosure relate generally to the use of multiple primary coils in a wireless power transmission apparatus. Some implementations more specifically relate to a wireless power transmission apparatus (such as a charging pad or surface) having multiple local controllers to activate different primary coils. In accordance with this disclosure, a wireless power transmission apparatus may have a plurality of local controllers that manage different primary coils. Thus, the primary coils may be independently capable of transmitting wireless power. According to implementations of this disclosure, when one primary coil is transmitting wireless power, its local controller may disable adjacent or overlapping coils to mitigate undesirable interference from the adjacent or overlapping coils. The techniques in this disclosure may be used by local controllers that can send or receive status signals from other local controllers associated with adjacent or overlapping primary coils.

The wireless power transmission apparatus may have separate circuitry for each primary coil such that each primary coil can be energized independently. For example, each primary coil may be associated with a different local controller, driver, voltage regulator, and the like. A local controller may include communications capabilities, control capabilities, a driver, or other power signal generating and processing circuits. In some implementations, the local controller (when connected to one of the primary coils) may implement wireless power transfer according to a standardized wireless power specification, such as the Qi® specification provided by the Wireless Power Consortium. For example, the wireless power transmission apparatus may include multiple primary coils, where each primary coil can be connected to a local controller to conform to the Qi specification. Each local controller may determine whether to cause its associated primary coil to transmit wireless power. For example, the local controller may periodically activate one more switches associated with the primary coil (and series capacitor) to excite (or briefly energize) the primary coil. The local controller may perform a coil current sensing process to determine if a wireless power receiving apparatus is located near the primary coil. The local controller that receives a communication from the wireless power receiving apparatus in response to a ping action may determine that the wireless power receiving apparatus is in proximity to its primary coil. The local controller may cause its primary coil to provide wireless energy to the secondary coil of the wireless power receiving apparatus. If a wireless power receiving apparatus is detected, the local controller may activate one or more switches associated with the primary coil to cause the primary coil to transmit wireless power.

However, unless otherwise disabled, the other local controllers that are associated with nearby primary coils may continue to ping for the presence of a second wireless power receiving apparatus. This can cause undesirable interference or EMI which interferes and hence decreases the rate of the wireless power transfer by the primary coil that is already activated. Thus, in accordance with implementations of this disclosure, when the local controller has activated its associated primary coil, the local controller can send a status signal to other local controllers to disable the adjacent or overlapping coils from activating. For example, the status signal may be sent to a disable input of the one or more other local controllers to prevent the adjacent or overlapping coils from attempting to ping or otherwise activate the adjacent or overlapping coils. In some implementations, a first local controller may send a status signal to other local controllers associated with non-adjacent coils that interfere with the primary coil associated with the first local controller. For brevity, this description is based on adjacent or overlapping coils which may provide a highest disturbance or interference. However, the techniques may be used to disable non-adjacent or non-overlapping coils that have a potential to create interference to a primary coil that is currently providing power.

In some implementations, a wireless power transmission apparatus may support positional freedom such that a wireless power receiving apparatus may be charged regardless of positioning or orientation of the wireless power receiving apparatus. For example, the primary coils may be independently activated or deactivated based on whether it is aligned with a wireless power receiving apparatus. In some implementations, the wireless power transmission apparatus may support concurrent charging of multiple wireless power receiving apparatuses using different primary coils that are not adjacent or overlapping. Each primary coil may be independently activated or deactivated based on a detection of a wireless power receiving apparatus in proximity to the primary coil. Furthermore, it may be unnecessary to impose a limit to the orientation of the wireless power receiving apparatus. The wireless power transmission apparatus (using local controllers) may activate whichever primary coil is best suited to provide wireless power to the wireless power receiving apparatus based on the position of the wireless power receiving apparatus.

In some implementations, the primary coils may be logically organized in groups of primary coils based on coils that are adjacent or overlapping. A primary coil may belong to multiple groups, based on adjacency to other primary coils of the wireless power transmission apparatus. A group of primary coils may be referred to as a zone in some aspects of this disclosure. Each zone of the wireless power transmission apparatus may have zone circuitry capable of combining status signals from multiple local controllers and providing a combined status signal to a local controller in the zone so that that local controller will disable its associated primary coil. For example, when a local controller receives a communication from the wireless power receiving apparatus in response to a ping action, the local controller may send a status signal to other local controllers having primary coils in the zone. While a first primary coil of the zone is providing power to the wireless power receiving apparatus, the other primary coils will remain disabled. Therefore, in some implementations, the status signal may disable or disconnect (also referred to as "muting") the adjacent primary coils to prevent the adjacent primary coils (near the first primary coil) from transmitting energy or pinging.

Muting an adjacent primary coil may be performed by disabling the local controller associated with the adjacent primary coil.

In some implementations, each local controller may have a disable input that receives one or more status signals from other local controllers that are associated with adjacent or overlapping primary coils. The disable input may cause the local controller to disable its associated primary coil when any of the other local controllers that are associated with adjacent or overlapping primary coils are transmitting wireless power. For example, a logic circuit (such as a logical OR gate) may combine status signals from other local controllers that are associated with adjacent or overlapping primary coils. The combined status signal may be connected to the disable input of a local controller to prevent that local controller from activating its primary coil when one of the adjacent or overlapping coils are activated. In some implementations, the logical circuit may be embedded in the local controller or may be a separate component between local controllers.

Particular implementations of the subject matter described in this disclosure can be implemented to realize one or more of the following potential advantages. In some implementations, the described techniques can be used to enable charging of one or more wireless power receiving apparatuses in various positions or orientations. The efficiency of the wireless power transmission apparatus may be improved by muting or disabling overlapping or adjacent coils based on charging status of each primary coil. The ability to mute adjacent primary coils may improve the efficiency, speed, and reliability of providing power to a wireless power receiving apparatus. For example, muting the adjacent primary coils may prevent disturbance that would otherwise impact the charging time used to charge the wireless power receiving apparatus.

FIG. 1 shows an example wireless power system that includes a wireless power transmission apparatus capable of charging multiple wireless power receiving apparatuses. The wireless power system 100 includes a wireless power transmission apparatus 110 which has multiple primary coils 120 (shown as primary coils 121, 122, 123, and so on). Each of the primary coils 120 may be associated with a power signal generator and a local controller. For example, a first primary coil 121 may be associated with power signal generator 141 and managed by a first local controller 131. Similarly, a second primary coil 122 may managed by a second local controller 132, a third primary coil 123 may managed by a third local controller 133, and so on. Each primary coil may be a wire coil which transmits a wireless power signal (which also may be referred to as wireless energy). The primary coil may transmit wireless energy using inductive or magnetic resonant field. The power signal generator may include components (not shown) to prepare the wireless power signal. For example, the power signal generator may include one or more switches, drivers, a series capacitor, or other components. In some implementations, the power signal generator, local controller, and other components (not shown) may be collectively referred to as transmitter circuit 130. In some implementations, some or all of the transmitter circuit 130 is embodied as an integrated circuit (IC) that implements features of this disclosure for independent or distributed control of separate primary coils. There may be a variety of ways to implement a local controller, including a microcontroller, dedicated processor, integrated circuit, application specific integrated circuit (ASIC), or the like. In some implementations, an integrated circuit (IC) may implement the features of one or more of the local controllers. The wireless power transmission apparatus 110 may include a power source 180 which is configured to provide power to each of the transmitter circuits in the wireless power transmission apparatus 110. The power source 180 may convert alternating current (AC) to direct current (DC).

The local controllers may be configured to detect the presence or proximity of a wireless power receiving apparatus. For example, the local controllers may cause their associated primary coils to periodically transmit a detection signal and measure for a change in coil current or load that indicates an object near the primary coil. The local controller may be configured to determine when a wireless power receiving apparatus is placed in proximity to its associated primary coil. For example, the first local controller may cause the associated primary coil to periodically transmit a detection signal and measure for a change in coil current or load that indicates an object near the primary coil. In some implementations, the local controller may detect a ping, wireless communication, load modulation, or the like.

In the example of FIG. 1, a first wireless power receiving apparatus 210 may be detected at a first primary coil 121. The first wireless power receiving apparatus 210 includes a secondary coil 220. A wireless power receiving apparatus may be any type of device capable of receiving wireless power, including a mobile phone, computer, laptop, peripheral, gadget, robot, vehicle, or the like. When a wireless power receiving apparatus (such as the first wireless power receiving apparatus 210) is placed on the wireless power transmission apparatus 110 near the first primary coil 121, the first local controller 131 may detect its presence. For example, during a detection phase, the first primary coil 121 may transmit a detection signal (which also may be referred to as a ping). The coil current at the first primary coil 121 may be measured to determine whether the coil current has crossed a threshold indicating an object in the electromagnetic field of the first primary coil 121. If an object is detected, the first local controller 131 may wait for a handshake signal from the first wireless power receiving apparatus 210 (such as an identification signal or setup signal) to determine whether the object is a wireless power receiving apparatus or a foreign object. The handshake signal may be communicated by the first wireless power receiving apparatus 210 using a series of load changes (such as load modulations). The load changes may be detectable by a coil voltage or current sensing circuit and interpreted by the first local controller 131. The first local controller 131 may interpret the variations in the load to recover the communication from the first wireless power receiving apparatus 210. The communication may include information such as charging level, requested voltage, received power, receiver power capability, support for a wireless charging standard, or the like.

The first wireless power receiving apparatus 210 may include a secondary coil 220, a rectifier 230, a receive (RX) controller 240 and an optional battery module 250. In some implementations, the battery module 250 may have an integrated charger (not shown). The secondary coil 220 may generate an induced voltage based on the received wireless power signal from the first primary coil 121. A capacitor (not shown) may be in series between the secondary coil 220 and the rectifier 230. The rectifier 230 may rectify the induced voltage and provide the rectified voltage to the battery module 250. The battery module 250 may be in the wireless power receiving apparatus 210 or may be an external device that is coupled by an electrical interface. The battery module 250 may include a charger stage, protection circuits such as a temperature-detecting circuit, and overvoltage and over-current protection circuits. Alternatively, the receive controller 240 may include a battery charging management module to collect and process information on a charging state of the battery module 250. In some implementations, the receive controller 240 may be configured to communicate with the first local controller 131 using load modulation via the secondary coil 220.

In the example of FIG. 1, because the first wireless power receiving apparatus 210 is detected at the first primary coil 121, the first local controller 131 may activate the first primary coil 121 to transmit wireless power to the first wireless power receiving apparatus 210. The first local controller 131 may send a status signal 161 to other local controllers (including a second local controller 132) that is associated with adjacent or overlapping primary coils (such as the second primary coil 122). The status signal 161 may be a local bolean value (such as “1” or “0”) to indicate whether or not the first local controller 131 has activated its associated first primary coil 121. In some implementations, the status signal 161 may be a floating-point value or communication signal that can convey additional information, such as charging status, quality metric, efficiency, or the like. The status signal 161 may cause the local controllers associated with nearby primary coils to disable their primary coils while the first primary coil 121 is transmitting wireless power. Thus, the nearby primary coils (including the second primary coil 122) will remain disabled and will not ping or create interference.

The wireless power system 100 of FIG. 1 includes a second wireless power receiving apparatus 260 that is near the third primary coil 123. As described above, the third local controller 133 may control the third primary coil 123 separately from the other transmitter circuits. Thus, the third local controller 133 may cause the third primary coil 123 to transmit wireless power to the second wireless power receiving apparatus 260 while the first local controller 131 causes the first primary coil 121 to transmit wireless power to the first wireless power receiving apparatus 210. Furthermore, the first local controller 131 and the third local controller 133 may manage the parameters associated with wirelessly charging at their respective primary coils. For example, the voltage level, power transmission frequency and voltage, power level, or other parameter may be different for each of the first primary coil 121 and the third primary coil 123 based on the type of wireless power receiving apparatus or charging level of their respective batteries.

The third local controller 133 may send a status signal 163 to local controllers that are associated with adjacent or overlapping primary coils. In the example of FIG. 1, the second local controller 132 may receive status signals 161 and 163 from both the first local controller 131 and the third local controller 133. Therefore, if either of the first primary coil 121 or the third primary coil 123 (both of which are nearby to the second primary coil 122) are providing wireless power, the second local controller 132 may disable the second primary coil 122 to prevent interference to those primary coils 121 and 123.

Figure 2:
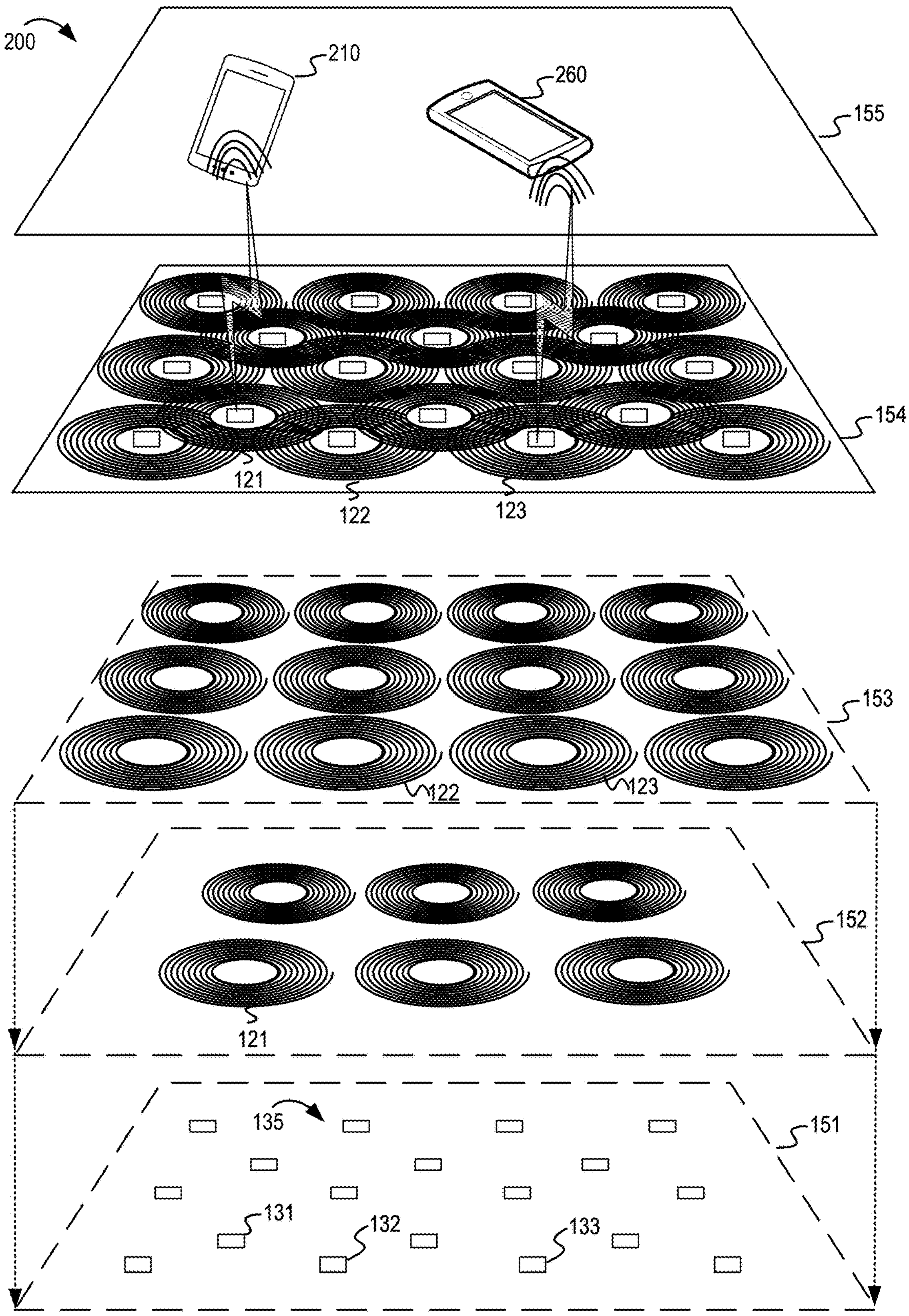
FIG. 2 shows an example wireless power transmission apparatus having multiple layers of primary coils arranged in an overlapping pattern.

FIG. 2 shows an example wireless power transmission apparatus having multiple layers of primary coils arranged in an overlapping pattern. The example wireless power transmission apparatus 200 includes 18 primary coils arranged in two overlapping layers. However, the quantity and arrangement of primary coils are provided as an example. Other quantities of primary coils, number of layers, or arrangements may be possible.

Beginning from the bottom 151, a number of local controllers 135 are shown, including a first local controller 131, a second local controller 132, and a third local controller 133. The local controllers do not necessarily need to be placed directly under their associated primary coil. However, for ease of illustration they are shown in the same configuration as their corresponding primary coils which are locate in a first layer 152 and a second layer 153. For example, the first primary coil 121 is shown on the first layer 152, along with several other primary coils. The second primary coil 122 is shown on the second layer 153 with other primary coils. A combined view 154 shows the coils overlapping with their corresponding local controllers in the center of each coil. Again, this depiction is provided for ease of illustration. In some implementations, the quantity of coils and overlap may be such that there are few or no dead zones in the charging surface 155. In addition to the wireless power transmission apparatus 200, FIG. 2 shows the first wireless power receiving apparatus 210 and the second wireless power receiving apparatus 260 placed on the charging surface 155. The first wireless power receiving apparatus 210 is able to latch and receive wireless power from the first primary coil 121 based on its position over that transmitter circuit. Similarly, the second wireless power receiving apparatus 260 may latch and receive wireless power from the third primary coil 123.

Various optional features may be incorporated into the design of the wireless power transmission apparatus. For example, in some implementations, ferrite material may be used in portions of the wireless power transmission apparatus to maintain a magnetic field with no (or few) dead zones. The ferrite material may be used to evenly distribute the electromagnetic field. In some implementations, the shape of the coils, amount of overlap, and materials may be selected to improve efficiency, reduce dead zones, or both.

Although described as a charging pad, the structure of the wireless power transmission apparatus may be different. For example, the wireless power transmission apparatus may be located in a vehicle, a piece of furniture, a part of a wall, a floor, or the like. In some implementations, the wireless power transmission apparatus may be integrated as part of a table-top, coffee table, desk, counter, or the like.

Figure 3:
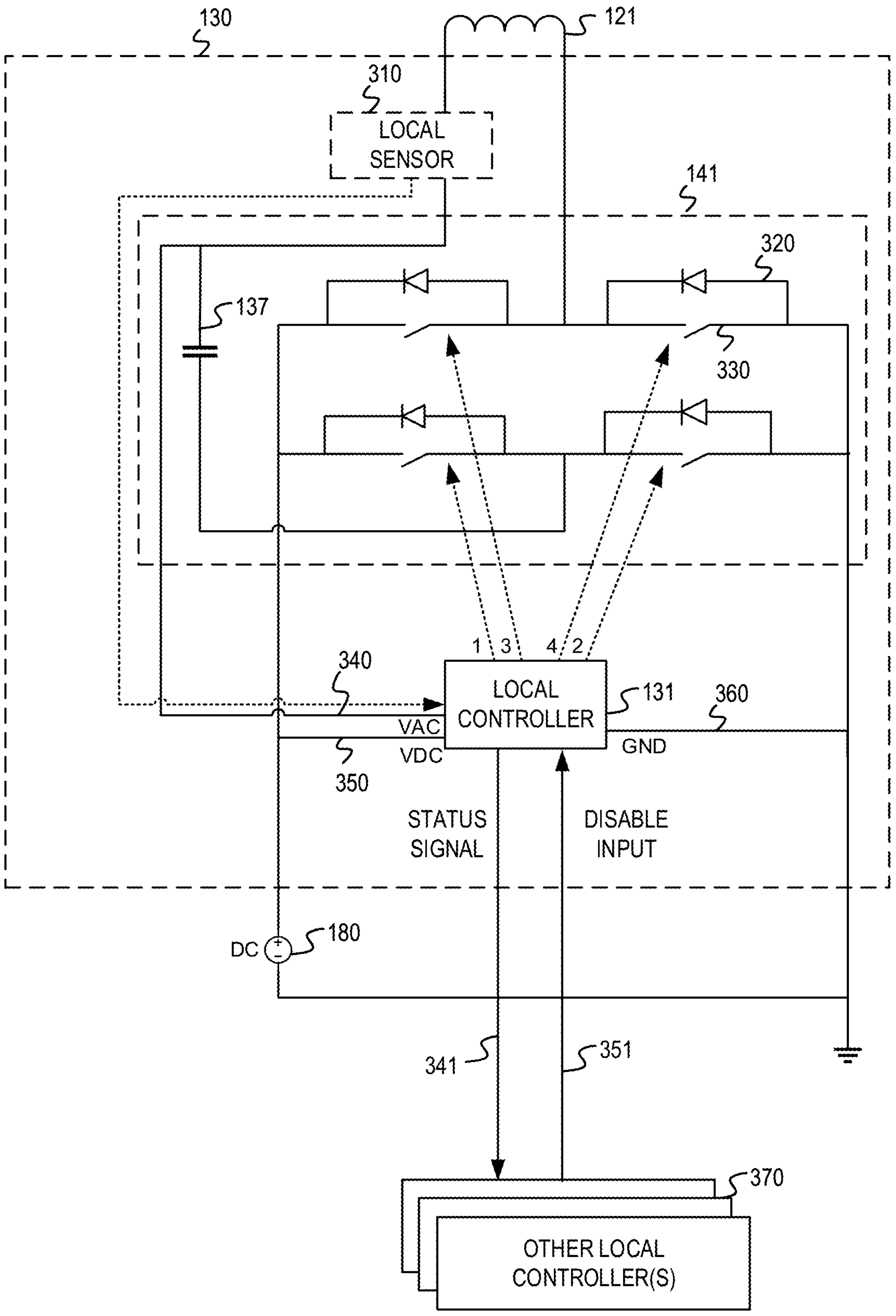
FIG. 3 shows an example transmitter circuit which may be associated with each primary coil.

FIG. 3 shows an example transmitter circuit which may be associated with each primary coil. As mentioned above, in some implementations, the transmitter circuit 130 may be embodied as an integrated circuit. Alternatively, the some or all of the components of the transmitter circuit 130 may be implemented as separate electrical components on a printed circuit board. In FIG. 3, the power source 180 and the first primary coil 121 are shown for reference as possible connections to the transmitter circuit 130. In some implementations, the connections between the power source 180, the transmitter circuit 130, and the first primary coil 121 may be accomplished using a printed circuit board.

The example transmitter circuit 130 in FIG. 3 is one of a multitude of designs which could be used with the present disclosure. In the design of FIG. 3, the first local controller 131 receives DC power using a DC input line 350 electrically coupled to the power source 180. The DC power may be a particular voltage (such as 5V or 12V). Alternatively, the local controller may include a power conditioning stage to cater to the voltage requirements of the sub modules in the local controllers. The same DC voltage may be electrically coupled to several switches, such as switch 330. The switch 330 may include a semiconductor switch such as a metal-oxide-semiconductor field-effect transistor (MOSFET), an insulated gate bipolar transistor (IGBT), or the like. Alternatively, the switch 330 may include a mechanical switch. In the example of FIG. 3, each switch may be paired with a diode 320. Other components (such as a driver) are not shown in the figure but may be included in the path.

The first local controller 131 also may switch the devices to covert the power source 180 from a DC output to an AC output across center points of the two legs of the bridge. The coil voltage VAC is fed to the local controller using the link 340. The switches can be used to control the applied voltage to the capacitor-primary coil pair. For example, the first local controller 131 may vary the duty ratio of each switch leg, the phase angle of applied voltage between the switch legs, the frequency of the applied voltage, or a combination thereof. The first local controller 131, switches, drivers, diodes, and the like, may be referred to as the power signal generator 141. In some implementations, the drivers may be incorporated in the first local controller 131. Furthermore, the first local controller 131 may control the power signal generator 141 using outputs (marked 1, 2, 3, 4) to each of the switches. The first local controller 131 and switches may be electrically coupled to a ground line 360 to complete the circuit. The capacitor and primary coil form a resonant circuit.

In some implementations, the transmitter circuit 130 may include a coil current sensing circuit, which is referred to as a local sensor 310 in this disclosure. The transmitter circuit 130 may be capable of detecting a load change on the first primary coil 121. The local sensor 310 may be a current sensor connected in series with the first primary coil 121. The first local controller 131 may determine whether an object is present based on the load change measured by the local sensor 310. The local controller may use the sensed current, the sensed voltage VAC 340 or combination thereof to determine the load change. A communication unit (not shown) also may be present or may be incorporated in the first local controller 131. The communication unit may monitor load changes measured by the local sensor 310 and/or VAC 340 to decode load modulated data. The communication unit may receive identification (ID), charging state information, voltage control information, or other information reported by a wireless power receiving apparatus.

The first local controller 131 is configured to send a status signal 341 to one or more other local controllers 370. The status signal 341 may be simple or complex in different implementations. For example, in one implementations, the status signal 341 represents a first boolean value "on" (or "1," 5V, or the like) if the first local controller 131 is currently transmitting wireless power via the first primary coil 121 and may be a second boolean value "off" (or "0," 0V, or the like) if the first local controller 131 is not currently transmitting wireless power via the first primary coil 121. Alternatively, the voltage of the status signal 341 may be indicative of different values, or the status signal 341 may include a modulated communication signal. The first local controller 131 is configured to status signal from other local controllers. For example, the incoming status signal may be received by a disable input 351 of the first local controller 131. When the disable input 351 indicates that the one or more of the other local controllers 370 are activated, the first local controller 131 may disable the first primary coil 121.

The transmitter circuit 130 described in FIG. 3 may be duplicated in a wireless power transmission apparatus. For example, there may be a different transmitter circuit for each primary coil of the wireless power transmission apparatus. Other designs may be possible. For example, the first local controller 131 may control more than one primary coil. Alternatively, an IC may include multiple transmitter circuits to independently control different primary coils. Because the primary coils may be independently controlled by their corresponding local controllers, it is possible to simplify the design of a zoneless, free-position charging pad. For example, each primary coil is driven and controlled by separate transmitter circuit that can detect the wireless power receiving apparatuses. Only those primary coils that have a wireless power receiving apparatus present, and which do not have disable input indicating an adjacent or overlapping primary coil is activated, will be energized for charging. The design may eliminate or reduce the need for additional position sensors or orientation sensors to detect the location of the wireless power receiving apparatus on the charging pad. EMI can be reduced by deactivating the primary coils that do not have a wireless power receiving apparatus present. Furthermore, the wireless power receiving apparatus may have different orientations (supported by different primary coils).

Figure 4:
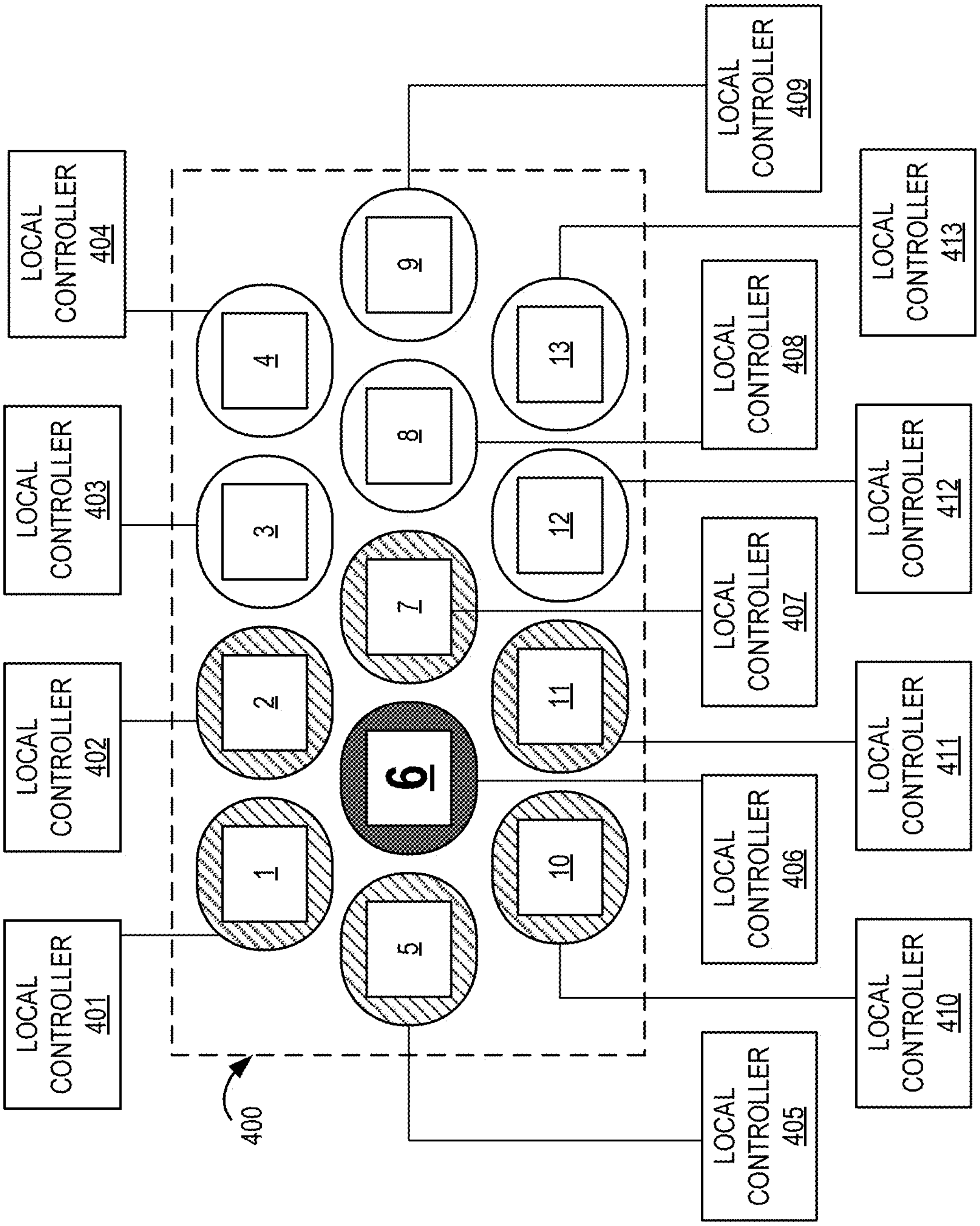
FIG. 4 shows an example wireless power transmission apparatus with adjacent primary coil muting.

FIG. 4 shows an example wireless power transmission apparatus with adjacent primary coil muting. The charging surface 400 in FIG. 4 shows the arrangement of 13 primary coils (numbered 1-13) which are managed by a plurality of local controllers (numbered 401 to 413). A first local controller 401 is associated with a first primary coil 1, a second local controller 402 is associated with a second primary coil 2, and so on. While the illustration in FIG. 4 shows the coils as non-overlapping, in some implementations the coils may be partially overlapped.

Figure 5:
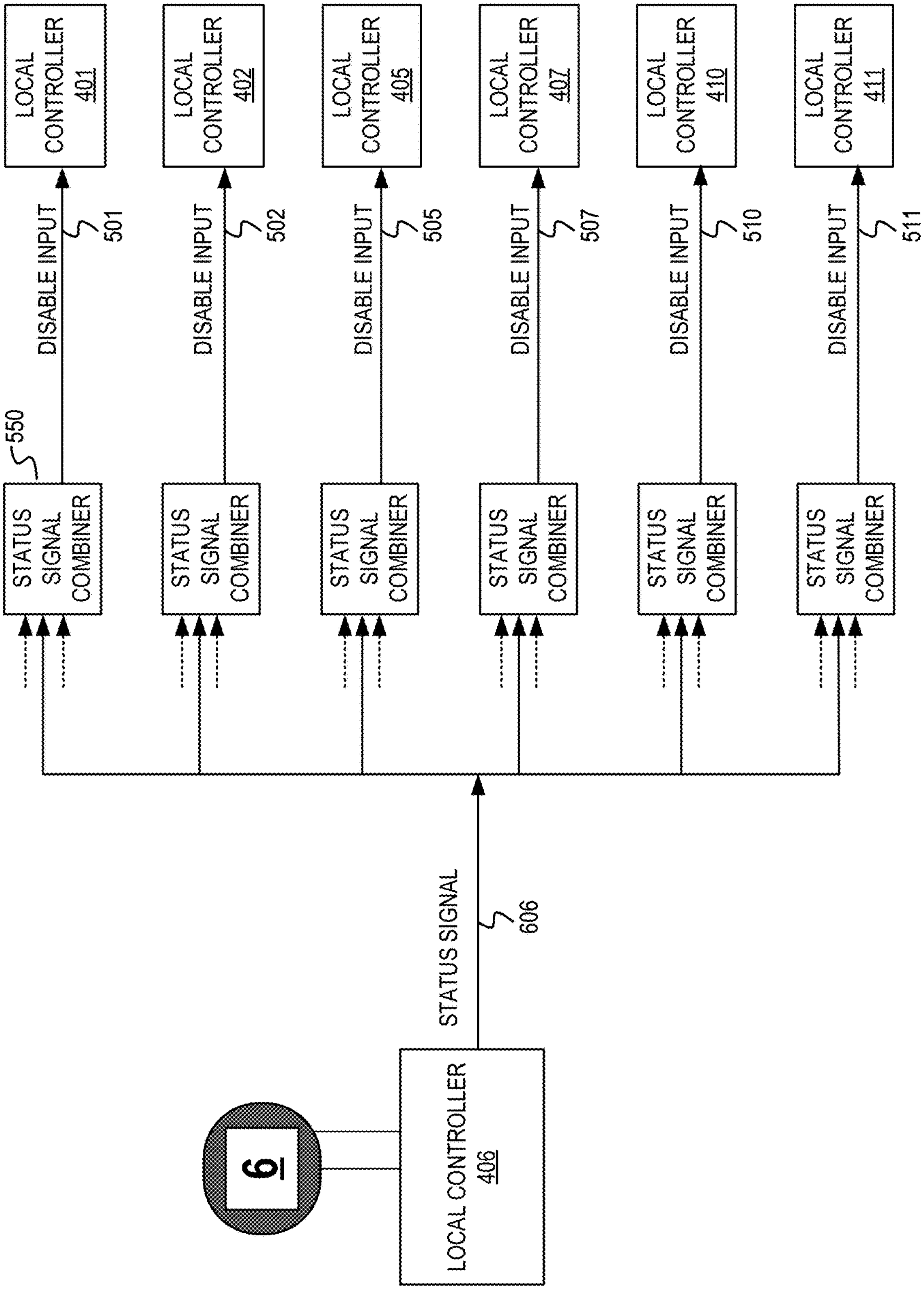
FIG. 5 shows an example of muting adjacent primary coils using a status signal combiner.
Figure 6:
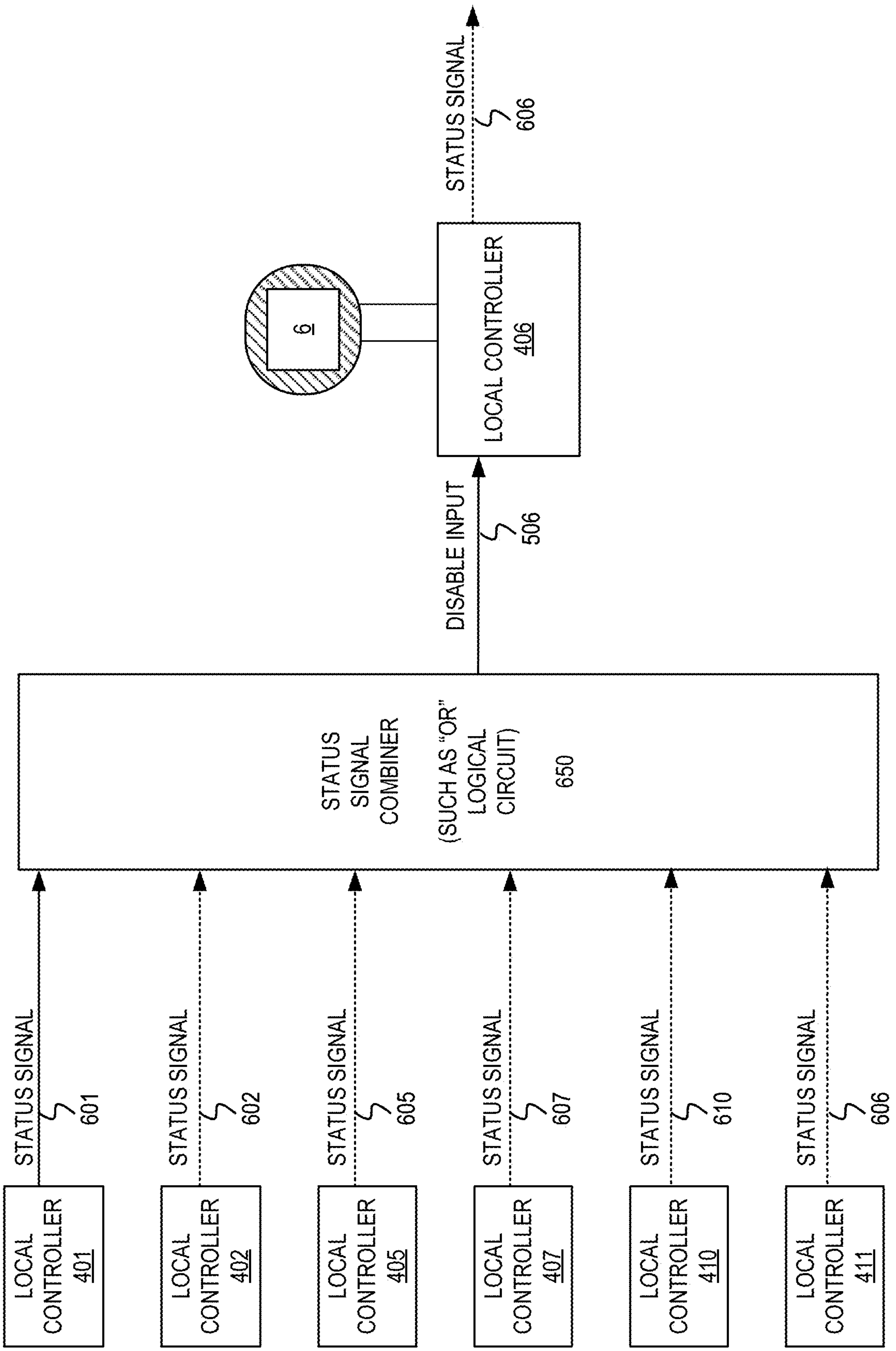
FIG. 6 shows an example of a disable input based on status signals from multiple local controllers.

The local controllers are communicatively coupled (not shown) to other local controllers that are associated with overlapping or adjacent primary coils. In the example of FIG. 4, a wireless power receiving apparatus (not shown) may be in proximity to primary coil 6. The local controller 406 associated with primary coil 6 may activate wireless charging by primary coil 6 and send a status signal to disable the adjacent primary coils 1, 2, 5, 7, 10, and 11. FIGS. 5 and 6 provide more detail how the status signal may be communicated. In some implementations the status signal may be a logical value which is connected to a disable input of the other local controllers for nearby primary coils. Alternatively, the status signal may be connected to another input (such as fault state, standby state, or other mechanism) which disables or otherwise causes the local controllers 401, 402, 405, 407, 410, and 411 to disable use of the nearby primary coils 1, 2, 5, 7, 10, and 11.

Depending on which primary coils are enabled, the neighboring (also referred to as adjacent or overlapping) coils may be disabled. Table 1 shows an example of relationships between primary coils of FIG. 4 that get disabled when a particular primary coil is providing wireless power. The local controllers associated with these primary coils may be connected so that a local controller for the activated primary coil can disable the local controllers associated with the neighboring primary coils.

TABLE 1

| When primary coil # is enabled | Disable these primary coils |
|---|---|
| 1 | 2, 5, 6 |
| 2 | 1, 3, 6, 7 |
| 3 | 2, 4, 7, 8 |
| 4 | 3, 8, 9 |
| 5 | 1, 6, 10 |
| 6 | 1, 2, 5, 7, 10, 11 |
| 7 | 2, 3, 6, 8, 11, 12 |
| 8 | 3, 4, 7, 9, 12, 13 |
| 9 | 4, 8, 13 |
| 10 | 5, 6, 11 |
| 11 | 6, 7, 10, 12 |

TABLE 1-continued

| When primary coil # is enabled | Disable these primary coils |
|---|---|
| 12 | 11, 7, 8, 13 |
| 13 | 8, 9 12 |

In some implementations of this disclosure, the disabling of neighboring coils may be accomplished without the use of a supervisory controller or master controller. Rather, the disabling may be accomplished using connections between the local controllers according to their relationship with neighboring primary coils (such as described in Table 1). For example, the local controller 402 may disable the primary coil 2 when it receives a status signal indicating activation of any of the neighboring primary coils 1, 6, 7, or 3. FIGS. 5 and 6 describe some techniques for combining status signals from multiple neighboring local controllers.

FIG. 5 shows an example of muting adjacent primary coils using a status signal combiner. FIG. 5 is based on the example in FIG. 4 and Table 1. When the local controller 406 for primary coil 6 is providing wireless power via primary coil 6, the local controller 406 may send a status signal 606 which can be received at the disable inputs 501, 502, 505, 507, 510, and 511 of local controllers 401, 402, 405, 407, 410, and 411, respectively. Referring to Table 1, the status signal 606 from local controller 406 (for primary coil 6) would be sent to the local controllers 401, 402, 405, 407, 410, and 411 associated with primary coils, 1, 2, 5, 7, 10, and 11 (not shown). In the example of FIG. 5, the status signal 606 may be a first boolean value (such as "on") which is received at the disable input of the neighboring local controllers. The local controllers 401, 402, 405, 407, 410, and 411, upon detecting the first boolean value, are configured to disable the use of their primary coils. Thus, the neighboring primary coils would be muted or disabled to mitigate interference they would otherwise cause to primary coil 6.

In some implementations, a status signal combiner 550 may combine status signals from multiple local controllers associated with neighboring (adjacent or overlapping) primary coils. For example, the local controller 401 (primary coil 1) would be disabled when neighboring coils 2, 5, or 6 are activated. Referring to the example in FIG. 4, Table 2 shows the relationship of which status signals would cause the primary coil to be disabled. (Table 2 is similar to Table 1, simply repeated to show the relationships for disabling neighboring coils.)

TABLE 2

| Disable this primary coil # | When any of these neighboring primary coils are activated |
|---|---|
| 1 | 2, 5, 6 |
| 2 | 1, 3, 6, 7 |
| 3 | 2, 4, 7, 8 |
| 4 | 3, 8, 9 |
| 5 | 1, 6, 10 |
| 6 | 1, 2, 5, 7, 10, 11 |
| 7 | 2, 3, 6, 8, 11, 12 |
| 8 | 3, 4, 7, 9, 12, 13 |
| 9 | 4, 8, 13 |
| 10 | 5, 6, 11 |
| 11 | 6, 7, 10, 12 |
| 12 | 11, 7, 8, 13 |
| 13 | 8, 9 12 |

The status signal combiner 550 may combine status signals from local controllers 402 and 405 (not shown) and from local controller 406 to prepare a combined status signal for the disable input 501 of the local controller 401. In some implementations, the status signal combiner 550 may be a logical circuit, such as a logical "OR" gate which will provide the first boolean value ("on") when any of the status signals from the neighboring local controllers indicate that they are activated.

FIG. 6 shows an example of a disable input based on status signals from multiple local controllers. A status signal combiner 650 may be configured to provide a combined status signal to the disable input 506 of the local controller 406 associated with primary coil 6. When any of the status signals 601, 602, 605, 607, 610, or 611 (from neighboring local controllers 401, 402, 405, 407, 410, and 411, respectively) indicate that one of those neighboring local controllers are providing wireless power, the status signal combiner 650 will produce a combined status signal that disables the local controller 406. As described in FIG. 5, the status signal combiner 650 may be a logical circuit (such as an logical "OR" gate) that provides a first boolean value (such as "on") when any of the status signals 601, 602, 605, 607, 610, or 611 have the first boolean value.

Figure 7:
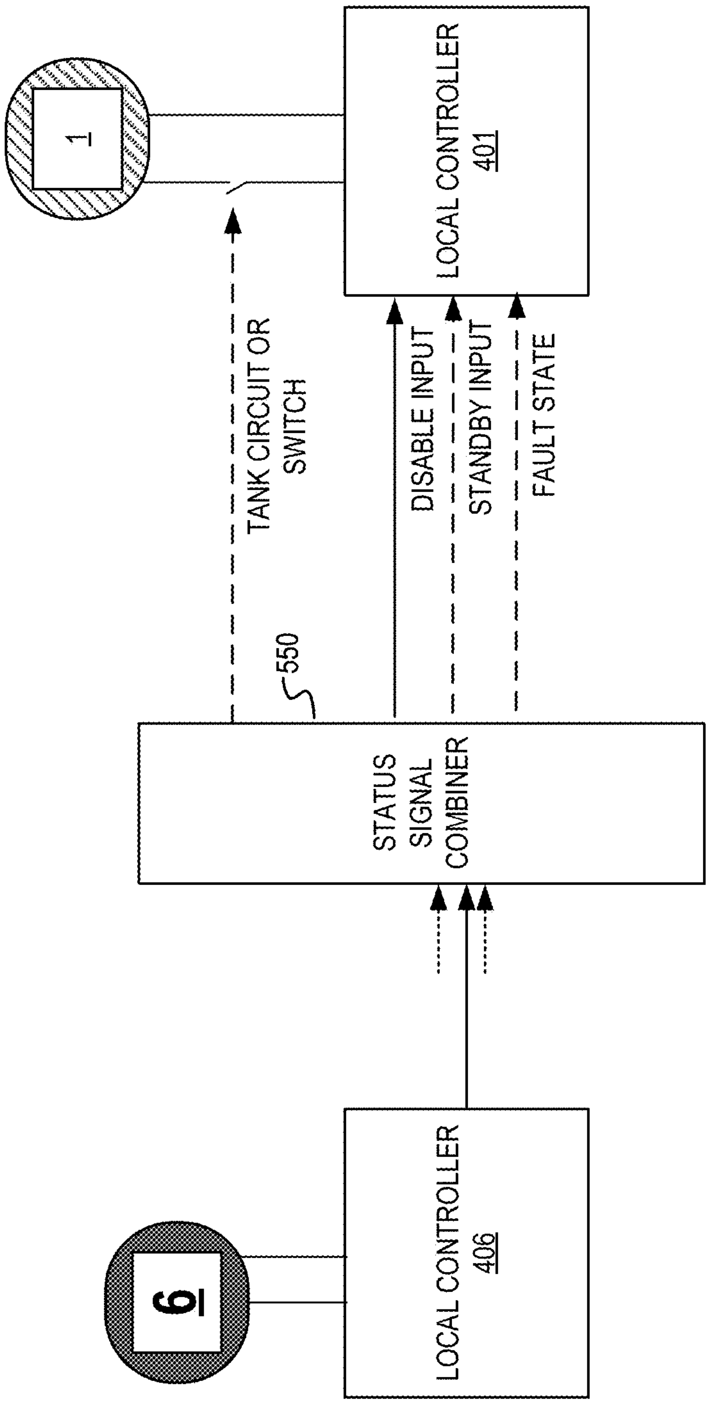
FIG. 7 shows further examples of how a local controller may be muted or disabled.

FIG. 7 shows further examples of how a local controller may be muted or disabled. FIG. 7 is based on a scenario in which local controller 406 is indicating that primary coil 6 is energized. For brevity, only the local controllers 401 and 406 for primary coils 1 and 6, respectively, are shown in the illustration of FIG. 7. The status signal combiner 550 may take status signals from local controller 406 and other local controllers (not shown). As described previously, the combined status signal from the status signal combiner 550 may be used with a disable input of the local controller 401 to cause the local controller 401 to disable primary coil 1. Although many examples in this disclosure are based on a discrete input ("disable input") at each local controller, there may be other ways in which a status signal from neighboring local controllers can disable a nearby local controller. FIG. 7 includes several other examples, which can be used separately or in various combinations.

In one example, a status signal may be used to put a neighboring local controller 401 in a standby mode. For example, a standby input or other discrete input of the neighboring local controller can cause the neighboring local controller to set a voltage or current setting to a standby or disable status. In some implementations, a standby input (which also may be referred to as a standby or shutdown pin) may cause the neighboring local controller to enter the standby mode.

In another example, a local controller 406 may induce a fault mode of the local controller 401. For example, the local controller 406 (via status signal and status signal combiner 550) may cause a change in voltages or currents detected by local controller 401. A fault mode at controller 401 may be associated with over-voltage, over-current, over-temperature, among other examples. By inducing a fault mode, the local controller 406 may force local controller 401 into a ready or fault state in which the local controller disables the primary coil 1. In some implementations, the fault mode or ready mode may only temporarily disable the primary coil 1 as the local controller 401 may begin regulating or controlling the primary coil 1 again once the fault mode is returned to normal state.

In another example, the local controller 406 (such as via status signal and status signal combiner 550) may cause a tank circuit or primary coil switch connected to the primary coil 1 to open. For example, the status signal (or combined status signal) may physically open the tank circuit of the neighboring primary coil 1.

Other examples may be possible within the scope of this disclosure. Regardless of the means for disabling the neighboring primary coil (via the its associated local controller or a tank switch), the means enable each local controller to disable the neighboring (adjacent or overlapping) primary coils when that local controller's primary coil is activated for wireless power transfer.

Figure 8:
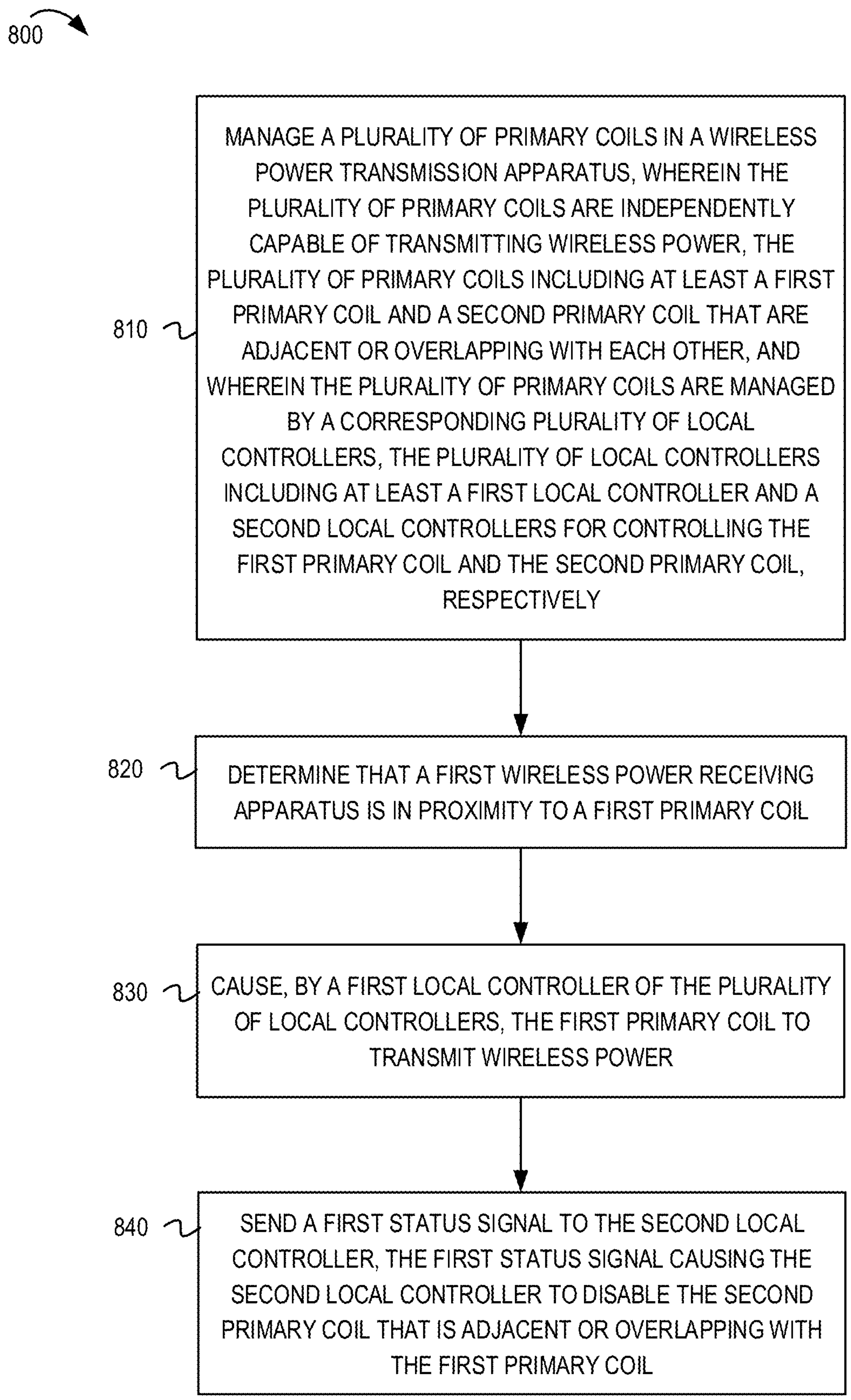
FIG. 8 shows a flowchart illustrating an example process for wireless power transmission.

FIG. 8 shows a flowchart illustrating an example process for wireless power transmission. The flowchart 800 begins at block 810. At block 810, a wireless power transmission apparatus may manage a plurality of primary coils. The plurality of primary coils may be independently capable of transmitting wireless power. The plurality of primary coils may include at least a first primary coil and a second primary coil that are adjacent or overlapping with each other. The plurality of primary coils may be managed by a corresponding plurality of local controllers, including at least a first local controller and a second local controllers for controlling the first primary coil and the second primary coil, respectively. At block 820, the wireless power transmission apparatus may determine that a first wireless power receiving apparatus is in proximity to a first primary coil. For example, the first local controller may detect a ping from the first wireless power receiving apparatus and may latch the first primary coil to the secondary coil of the wireless power receiving apparatus.

In response to a determination that a first wireless power receiving apparatus is in proximity to the first primary coil, at block 830, the first local controller may cause the first primary coil to transmit wireless power. At block 840, the first local controller may send a first status signal to the second local controller. The first status signal may cause the second local controller to disable the second primary coil that is adjacent or overlapping with the first primary coil.

Figure 9:
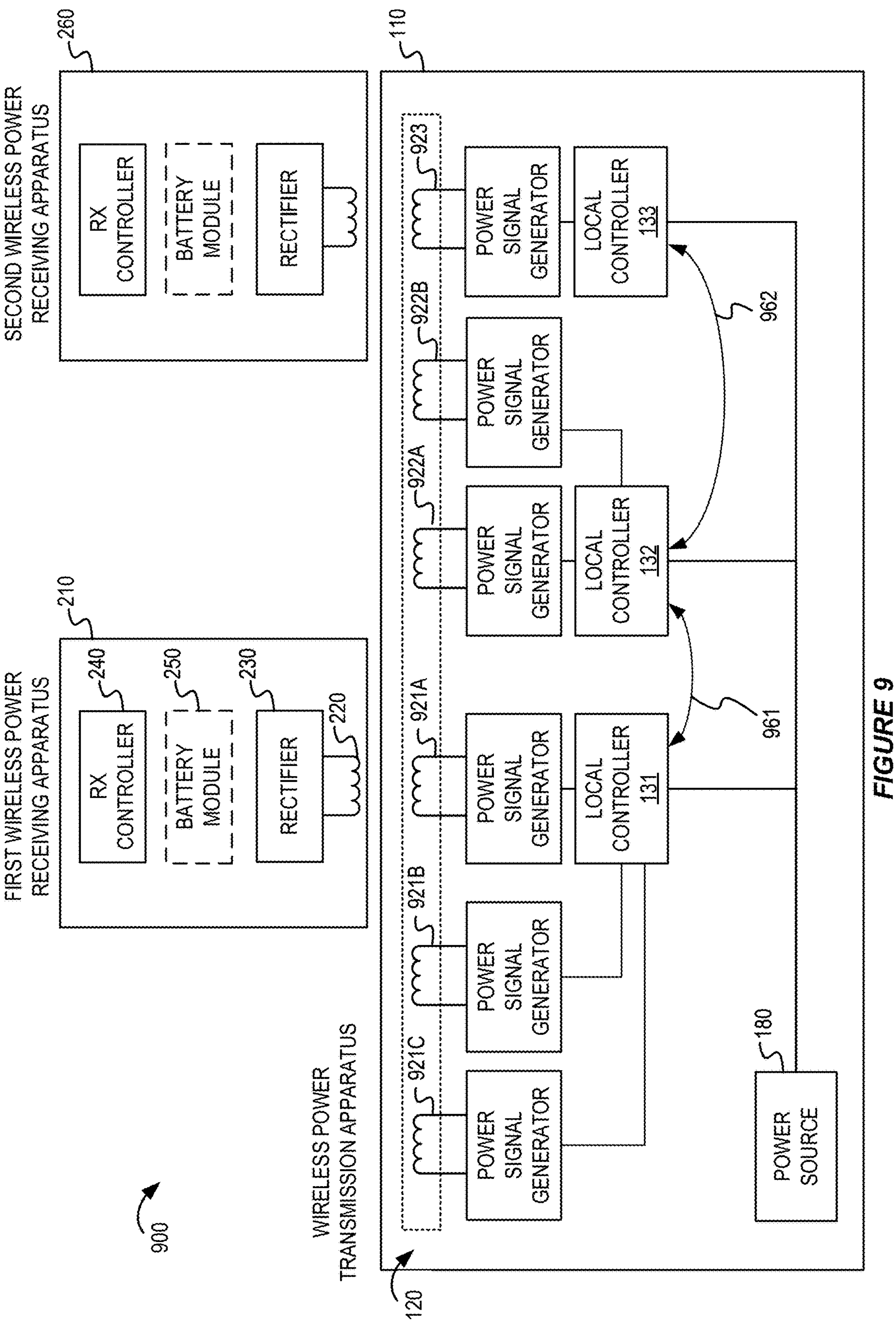
FIG. 9 shows an example wireless power system in which a local controller manages multiple primary coils and locally co-ordinates with other local controllers.

FIG. 9 shows an example wireless power system in which a local controller manages multiple primary coils and locally coordinates with other local controllers. The examples of this disclosure have included one primary coil controlled by each local controller. However, other examples may include local controllers capable of controlling more than one primary coil. For example, the wireless power system 900 includes a wireless power transmission apparatus 110 in which some local controllers (such as a first local controller 131 and a second local controller 132) may manage multiple primary coils. A first local controller 131 may manage primary coils 921A, 921B, and 921C. A second local controller 132 may manage primary coils 922A and 922B. A third local controller 133 may manage primary coil 923. In some implementations, the quantity of primary coils per local controller may be the same or may be different (such as shown in FIG. 9). In some implementations, the primary coils may be coupled to their respective local controller using relays (not shown). In some other implementations, the local controllers may be configured to manage multiple primary coils and power signal generators (as shown in FIG. 9). In some implementations, there can be a single power generator coupled to the local controller and the multiple coils 921A, 921B, and 921C can be coupled to the power signal generator using relays (not shown).

Similar to the example in FIG. 1, the local controllers 131, 132 and 133 may coordinate with other local controllers that manage adjacent or overlapping primary coils. For example, the first local controller 131 may coordinate with the second local controller 132 to disable primary coil 922A when a first wireless power receiving apparatus 210 is latched to primary coil 921A. For example, the first local controller 131 may send a status signal 961 to the second local controller 132 to cause the second local controller 922A to refrain from pinging on the primary coil 922A. However, in some implementations, the second local controller 132 may continue to ping on primary coil 922B.

When a second wireless power receiving apparatus 220 latches to primary coil 923 of the third local controller 133, the third local controller 133 may send a status signal 962 to the second local controller 132. The status signal 962 may cause the second local controller 132 to refrain from pinging using the primary coil 922B that is adjacent to primary coil 923.

Figure 10:
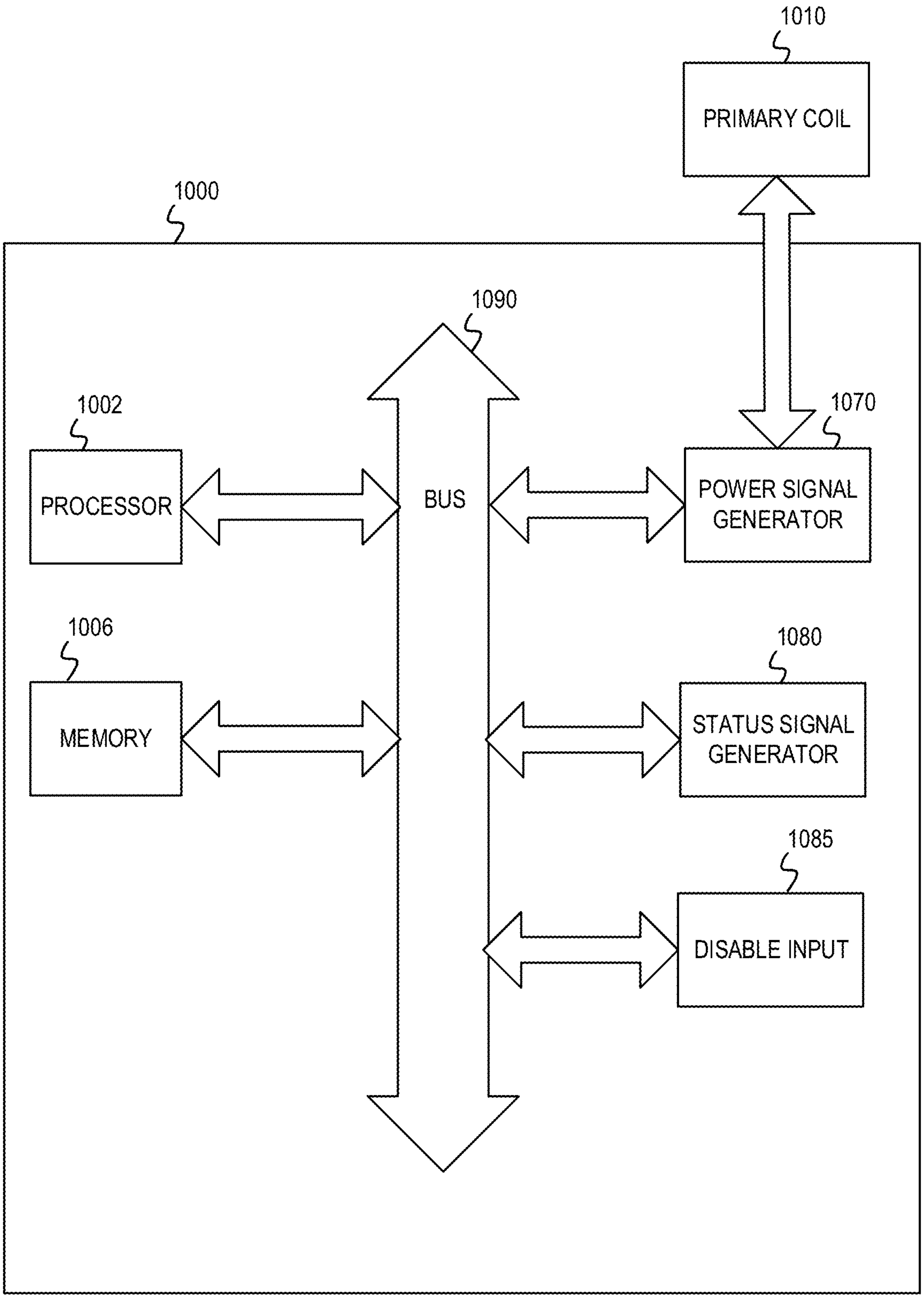
FIG. 10 shows a block diagram of an example electronic device for use in wireless power system.

FIG. 10 shows a block diagram of an example electronic device for use in wireless power system. In some implementations, the electronic device 1000 may be used in a wireless power transmission apparatus (such as the wireless power transmission apparatus 110). The electronic device 1000 may be an integrated circuit or other apparatus for use as a local controller (such as any of the local controllers described herein). The electronic device 1000 can include a processor 1002 (possibly including multiple processors, multiple cores, multiple nodes, or implementing multi-threading, etc.). The electronic device 1000 also can include a memory 1006. The memory 1006 may be system memory or any one or more of the possible realizations of computer-readable media described herein. The electronic device 1000 also can include a bus 1090 (such as PCI, ISA, PCI-Express, HyperTransport®, InfiniBand®, NuBus,® AHB, AXI, etc.).

The electronic device 1000 may be a local controller. In some implementations, the local controllers 1062 can be distributed within the processor 1002, the memory 1006, and the bus 1090. The electronic device 1000 may perform some or all of the operations described herein. The memory 1006 can include computer instructions executable by the processor 1002 to implement the functionality of the implementations described in FIGS. 1-9. Any one of these functionalities may be partially (or entirely) implemented in hardware or on the processor 1002. For example, the functionality may be implemented with an application specific integrated circuit, in logic implemented in the processor 1002, in a co-processor on a peripheral device or card, etc. Further, realizations may include fewer or additional components not illustrated in FIG. 10. The processor 1002, the memory 1006, and the local controllers 1062 may be coupled to the bus 1090. Although illustrated as being coupled to the bus 1090, the memory 1006 may be coupled to the processor 1002.

In some implementations, the electronic device 1000 may include a power signal generator (such as a driver, other power signal generator components, or other means) for providing power signal to a primary coil 1010. The electronic device 1000 also may include a status signal generator 1080 for providing a status signal to another local controller (not shown). The status signal generator 1080 may provide a status signal having an indication regarding whether the primary coil 1010 is activated (providing wireless power) or not. In some implementations, the status signal may be boolean value (such as "on" or "off") which can be sent to a status signal combiner or to a disable input of another local controller.

The electronic device 1000 also may include a disable input 1085 (or fault state input, standby input, or other similarly functioned input) which can disable the power signal generator 1070 or the primary coil 1010 in the event that the disable input 1085 receives an indication from another local controller (not shown) that a neighboring primary coil (not shown) is activated.

FIGS. 1-10 and the operations described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of or" one or more of a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A wireless power transmission apparatus, comprising:

a plurality of primary coils that are independently capable of transmitting wireless power, the plurality of primary coils including at least a first primary coil and a second primary coil that are adjacent or overlapping with each other; and a plurality of local controllers configured to manage the plurality of primary coils, the plurality of local controllers including at least a first local controller and a second local controller for controlling the first primary coil and the second primary coil, respectively, wherein, in response to a determination that a first wireless power receiving apparatus is in proximity to the first primary coil, the plurality of local iscontrollers are configured to:

cause the first primary coil to transmit wireless power, and disable the second primary coil that is adjacent or overlapping with the first primary coil while the first primary coil is transmitting the wireless power.

2. The wireless power transmission apparatus of claim 1, wherein in response to a determination that the first wireless power receiving apparatus is in proximity to the second primary coil, the plurality of local controllers are configured to:

cause the second primary coil to transmit wireless power, and disable the first primary coil that is adjacent or overlapping with the second primary coil while the second primary coil is transmitting the wireless power.

3. The wireless power transmission apparatus of claim 2, wherein the first local controller and the second local controller are configured to prevent concurrent transmission of wireless power by the first primary coil and the second primary coil.

4. The wireless power transmission apparatus of claim 1, wherein each of the plurality of local controllers is independently capable of managing transmission of wireless power via a separate primary coil.

5. The wireless power transmission apparatus of claim 1, wherein the first wireless power receiving apparatus is determined to be in proximity to the first primary coil based, at least in part, on a first communication received from the first wireless power receiving apparatus by the first local controller via the first primary coil.

6. The wireless power transmission apparatus of claim 1, wherein the plurality of primary coils further includes a third primary coil, wherein the first primary coil and the third primary coil are not adjacent or overlapping with each other, and wherein the plurality of local controllers are configured to concurrently transmit wireless power via the first primary coil and the third primary coil to different wireless power receiving apparatuses.

7. The wireless power transmission apparatus of claim 1, wherein each of the plurality of local controllers are communicatively coupled to at least one other local controller associated with an adjacent or overlapping primary coil.

8. The wireless power transmission apparatus of claim 1, further comprising:

at least a first logic circuit configured to:

combine one or more status signals from one or more local controllers associated with primary coils that are adjacent or overlapping with the second primary coil to form a combined status signal, and send the combined status signal to a disable input of the second local controller, wherein the disable input of the second local controller causes the second local controller to disable the second primary coil when any of the one or more other status signals indicate that an adjacent or overlapping primary coil is transmitting wireless power.

9. The wireless power transmission apparatus of claim 1, wherein each local controller has a disable input that receives one or more status signals from other local controllers that are associated with adjacent or overlapping primary coils, and wherein the disable input causes the local controller to disable its associated primary coil when any of the other local controllers that are associated with adjacent or overlapping primary coils are transmitting wireless power.

10. The wireless power transmission apparatus of claim 9, further comprising one or more logic circuits that combine one or more status signals from other local controllers that are associated with adjacent or overlapping primary coils and provide a combined status signal to the disable input.

11. The wireless power transmission apparatus of claim 10, wherein the one or more logic circuits comprise logical OR gates.

12. The wireless power transmission apparatus of claim 1, wherein each local controller is configured to provide a status signal to one or more other local controllers that are associated with adjacent or overlapping primary coils, and wherein the status signal causes the one or more other local controllers to disable their associated primary coils when the local controllers is transmitting wireless power.

13. The wireless power transmission apparatus of claim 12, wherein each status signal represents a boolean value to indicate whether each local controller is or is not transmitting wireless power via its associated primary coil.

14. The wireless power transmission apparatus of claim 12, wherein each status signal is a floating-point value, wherein each floating-point value indicates different information regarding wireless power transmission of an associated primary coil.

15. The wireless power transmission apparatus of claim 1, further comprising:

a charging pad on which multiple wireless power receiving apparatuses may be placed, wherein the plurality of primary coils is arranged in an overlapping pattern that is distributed among multiple layers of the charging pad.

16. The wireless power transmission apparatus of claim 1, wherein the first wireless power receiving apparatus is a movable device, and wherein the wireless power transmission apparatus includes a surface for transmitting power to the movable device while the movable device is in motion.

17. A method for transmission of wireless power comprising:

managing a plurality of primary coils in a wireless power transmission apparatus, wherein the plurality of primary coils are independently capable of transmitting wireless power, the plurality of primary coils including at least a first primary coil and a second primary coil that are adjacent or overlapping with each other, and wherein the plurality of primary coils are managed by a corresponding plurality of local controllers, the plurality of local controllers including at least a first local controller and a second local controller for controlling the first primary coil and the second primary coil, respectively;

determining that a first wireless power receiving apparatus is in proximity to a first primary coil; and in response to a determination that a first wireless power receiving apparatus is in proximity to the first primary coil:

causing the first primary coil to transmit wireless power, and disabling the second primary coil that is adjacent or overlapping with the first primary coil while the first primary coil is transmitting the wireless power.

18. The method of claim 17, further comprising:

in response to a determination that a second wireless power receiving apparatus is in proximity to the second primary coil:

causing the second primary coil to transmit wireless power, and disabling the first primary coil that is adjacent or overlapping with the second primary coil while the second primary coil is transmitting the wireless power.

19. The method of claim 17, wherein the first local controller and the second local controller are configured to prevent concurrent transmission of wireless power by the first primary coil and the second primary coil.

20. The method of claim 17, wherein each of the plurality of local controllers are communicatively coupled to at least one other local controller associated with an adjacent or overlapping primary coil.

21. The method of claim 17, further comprising:

combining one or more status signals from one or more local controllers associated with primary coils that are adjacent or overlapping with the second primary coil to form a combined status signal; and sending the combined status signal to a disable input of the second local controller, wherein the disable input of the second local controller causes the second local controller to disable the second primary coil when any of the one or more other status signals indicate that an adjacent or overlapping primary coil is transmitting wireless power.

22. A system comprising:

means for managing a plurality of primary coils in a wireless power transmission apparatus, wherein the plurality of primary coils are independently capable of transmitting wireless power, the plurality of primary coils including at least a first primary coil and a second primary coil that are adjacent or overlapping with each other, and wherein the plurality of primary coils are managed by a corresponding plurality of local controllers, the plurality of local controllers including at least a first local controller and a second local controllers for controlling the first primary coil and the second primary coil, respectively;

means for determining that a first wireless power receiving apparatus is in proximity to a first primary coil; and in response to a determination that a first wireless power receiving apparatus is in proximity to the first primary coil:

means for causing the first primary coil to transmit wireless power, and means for disabling the second primary coil that is adjacent or overlapping with the first primary coil while the first primary coil is transmitting the wireless power.

23. The system of claim 22, further comprising:

in response to a determination that a second wireless power receiving apparatus is in proximity to the second primary coil:

means for causing the second primary coil to transmit wireless power, and means for disabling the first primary coil that is adjacent or overlapping with the second primary coil while the second primary coil is transmitting the wireless power.

* * * * *